United States Patent
DeLong et al.

(10) Patent No.: US 11,034,330 B2
(45) Date of Patent: Jun. 15, 2021

(54) SYSTEM AND METHOD FOR DISTRIBUTING DIGITAL VEHICLE KEYS TO PASSIVE NFC DEVICES VIA NFC

(71) Applicant: Ford Global Technologies, LLC, Dearborn, MI (US)

(72) Inventors: Aaron Matthew DeLong, Toledo, OH (US); Vivekanandh Elangovan, Canton, MI (US); Kevin Thomas Hille, Plymouth, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/185,664

(22) Filed: Nov. 9, 2018

(65) Prior Publication Data

US 2020/0148168 A1 May 14, 2020

(51) Int. Cl.
*B60R 25/24* (2013.01)

(52) U.S. Cl.
CPC ........ *B60R 25/24* (2013.01); *B60R 2325/103* (2013.01)

(58) Field of Classification Search
CPC .............................. B60R 25/00; B60R 25/24
See application file for complete search history.

(56) References Cited

U.S. PATENT DOCUMENTS

| | | | |
|---|---|---|---|
| 8,798,809 B2 * | 8/2014 | Kalhous | G07C 9/00309 701/2 |
| 9,365,188 B1 * | 6/2016 | Penilla | B60R 25/2018 |
| 9,373,201 B2 * | 6/2016 | Jefferies | G07B 15/00 |
| 9,688,247 B1 * | 6/2017 | Jayaraman | B60R 25/24 |
| 10,384,644 B2 * | 8/2019 | Pudar | G07B 15/00 |
| 10,475,267 B2 * | 11/2019 | DeLong | B60R 25/20 |
| 10,493,954 B2 * | 12/2019 | Bjorkengren | B60R 25/406 |
| 2016/0055699 A1 | 2/2016 | Vincenti | |
| 2016/0217635 A1 | 7/2016 | Pudar et al. | |
| 2017/0104589 A1 | 4/2017 | Lambert et al. | |

FOREIGN PATENT DOCUMENTS

CN 105015489 B 4/1918
EP 2743868 A1 6/2014

OTHER PUBLICATIONS

Car Connectivity Consortium, *Building Digital Key Solution for Automotive*, 8 pages.
Continental-Corporation, *Intelligent Vehicle Door: Continental Continuing to Develop Digital Vehicle Keys*, Aug. 29, 2017, retrieved from https://www.continental-corporation.com/en/press/press-releases/2017-08-29-intelligent-door-93854 2 pages.
Octo Omoove—Oberthur Technologies, *EasyOpen, Transforming Smartphones into Car Keys*, retreived from https://www.octotelematics.com/news/easyopen-no-keys-no-cards 4 pages.

* cited by examiner

*Primary Examiner* — K. Wong
(74) *Attorney, Agent, or Firm* — Frank Lollo; Eversheds Sutherland (US) LLP

(57) ABSTRACT

A system includes a vehicle, a first passive Near-Field Communication (NFC) device, and a first mobile device communicatively coupled to the vehicle and including a digital vehicle key. The first mobile device distributes the digital vehicle key to the first passive NFC device and informs the vehicle an instance in which the mobile device has distributed the digital vehicle key to the first passive NFC device.

20 Claims, 4 Drawing Sheets

| Type | ID | Able to distribute digital vehicle key? | Digital vehicle key provider | Digital vehicle key recipient | # of distributions allowed | Distribution condition? | # of uses allowed | Use condition? |
|---|---|---|---|---|---|---|---|---|
| Mobile device | A | yes | External Server | NFC device B, Mobile device C | 5 | None | Unlimited | None |
| NFC device | B | no | Mobile device A | N/A | N/A | N/A | 5 | Mobile device A out of power OR Vehicle out of power |
| Mobile device | C | yes | Mobile device A | NFC device D, Mobile device E | 3 | Needs permission from Mobile device A | Unlimited | None |
| NFC device | D | no | Mobile device C | N/A | N/A | N/A | 4 | Mobile device A & C out of power OR Vehicle out of power |
| Mobile device | E | yes | Mobile device C | None | 3 | Needs permission from Mobile device A & C | 3 | Within 2 hours of receiving vehicle digital key |

FIG. 2

SYSTEM AND METHOD FOR DISTRIBUTING DIGITAL VEHICLE KEYS TO PASSIVE NFC DEVICES VIA NFC

TECHNICAL FIELD

The present disclosure generally relates to a system and method for distributing digital vehicle keys and, more specifically, a system and method for distributing digital vehicle keys to passive near field communication (NFC) devices via NFC.

BACKGROUND

A phone-as-a-key (PaaK) feature enables vehicles to be accessed via a mobile device functioning as a vehicle key and/or a key fob. While the PaaK feature facilitates interactions between a user and a vehicle, such feature is typically rendered useless when the mobile device is inoperable.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example system, method, and non-transitory computer readable media are disclosed. An example system includes a vehicle, a first passive Near-Field Communication (NFC) device, and a first mobile device communicatively coupled to the vehicle and including a digital vehicle key. The first mobile device distributes the digital vehicle key to the first passive NFC device and informs the vehicle an instance in which the mobile device has distributed the digital vehicle key to the first passive NFC device.

An example method includes distributing a digital vehicle key stored in a first mobile device to a first passive Near-Field Communication (NFC) device and informing a vehicle communicatively coupled to the first mobile device an instance in which the mobile device has distributed the digital vehicle key to the first passive NFC device.

An example non-transitory computer readable media storing instructions that are executable via processors to perform operations include distributing a digital vehicle key stored in a first mobile device to a first passive Near-Field Communication (NFC) device; and informing a vehicle communicatively coupled to the first mobile an instance in which the mobile device has distributed the digital vehicle key to the first passive NFC device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2 illustrates an example table generated by a vehicle key manager of the vehicle of FIG. 1.

DETAILED DESCRIPTION OF EXAMPLE EMBODIMENTS

Figure 1:
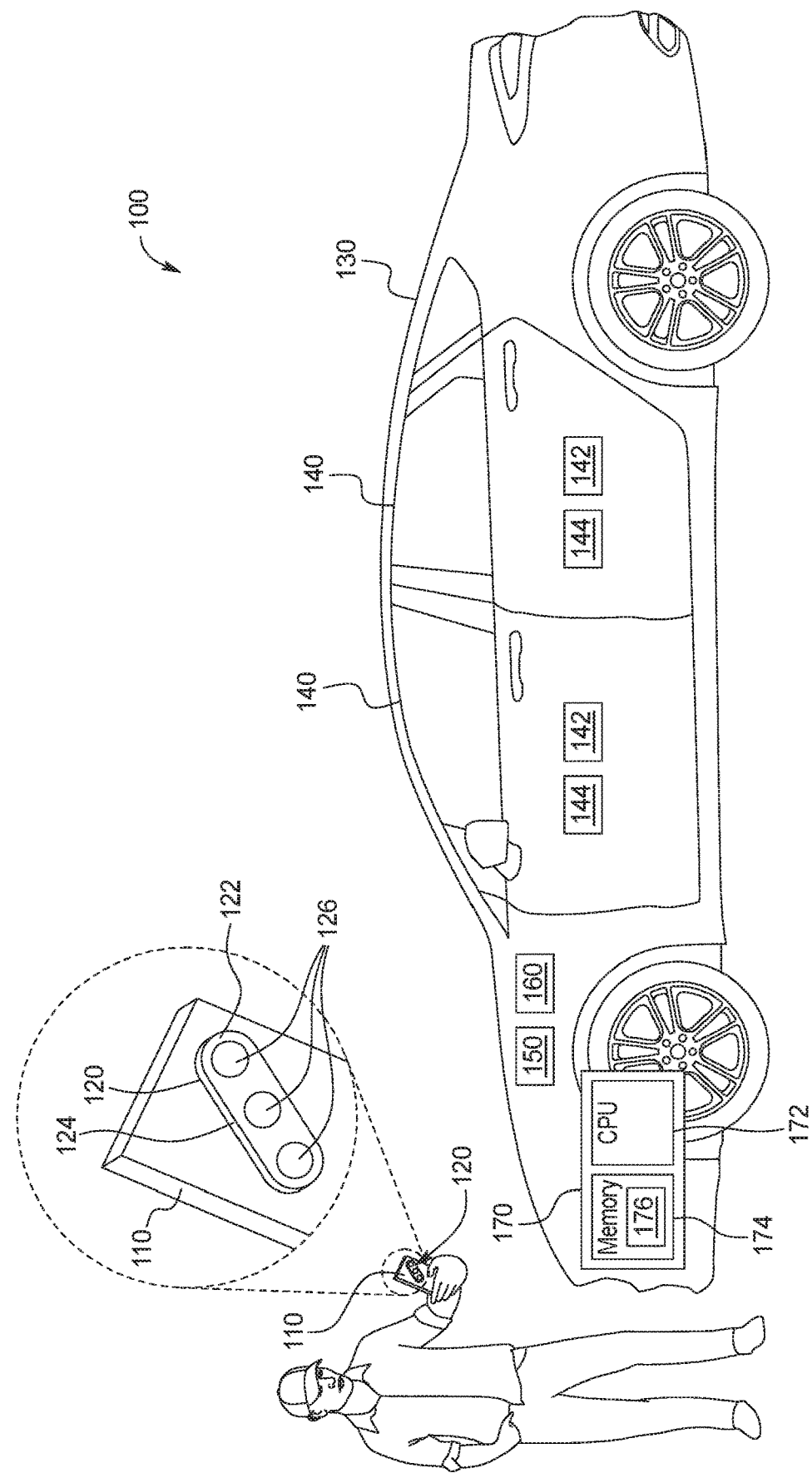
FIG. 1 illustrates an example system in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include a phone-as-a-key (PaaK) feature for using a mobile device functioning as a vehicle key and/or a key fob for accessing and/or activating the vehicles. The PaaK feature is particularly useful for vehicle passive entry passive start (PEPS) systems. A passive entry feature of the PEPS systems automatically grants access to the vehicle and/or activates the ignition of the vehicle when an authenticated mobile device is within a predetermined distance from the vehicle. While the PaaK feature facilitates interactions between a user and a vehicle, such feature is typically rendered useless when the mobile device is inoperable.

An example system described herein includes a vehicle, a mobile device, and one or more Near-Field Communication (NFC) tags. NFC is a communication protocol which enables two electronic devices in close proximity to establish communication. The mobile device includes a digital vehicle key for accessing the vehicle, and the vehicle also includes the same for verification purposes. The mobile device and/or the vehicle include an NFC reader and writer. The NFC reader reads data stored in an NFC tag and the NFC writer writes or erases data stored in the NFC tag. The mobile device and/or the vehicle are operable to: (1) distribute the digital vehicle key to one or more NFC tags; (2) establish an identity for each of one or more NFC tags including the digital vehicle key; and (3) account for a total number of distributions of the digital vehicle key. As such, the one or more NFC tags may be used as a back-up key when the mobile device is inoperable.

Turning to the figures, FIG. 1 illustrates an example system 100 in accordance with the teachings herein. The system includes a mobile device 110, an NFC device 120, and a vehicle 130.

The mobile device 110 includes at least one processor, at least one memory, at least one antenna, and at least one power source (not illustrated). The at least one processor and the at least one antenna define NFC reader and writer (not illustrated). The NFC reader is operable to read data stored in the NFC device, and the NFC writer is operable to write data to the NFC device. The mobile device 110 may be a cell phone, a smart phone, a smart pad, a wearable electronic device, etc. In some examples, the mobile device may further include one or more cameras, a biometric sensor, and one or more input devices (not illustrated). In the illustrated example, the mobile device 110 is designated as a PaaK. Herein, a PaaK or a mobile device 110 including the digital vehicle key should be construed to have the same meaning.

The NFC device 120 includes at least one antenna and at least one integrated circuit (not illustrated). The NFC device 120 is capable of having data written therein and having data read therefrom. The NFC device 120 may be passive or active. A passive NFC device is unpowered and uses electromagnetic field generated by another electronic device to power itself, whereas, an active NFC device 120 powers itself and is capable of generating its own electromagnetic field. For example, an active NFC device 120 may be a smart phone. Further, a passive NFC device may be a tag, a sticker, a keychain, a card, etc. A passive NFC device may also be a user interactive device. For example, such user interactive passive NFC device may include at least one button connected with the integrated circuit within said device. The user interactive passive NFC device draws power via electromagnetic field generated from an active device (i.e., a device including its own power source). Using the power, the user interactive passive NFC device transmits a command to the active device.

In the illustrated example, the NFC device 120 is a user-interactive passive NFC device. The user-interactive passive NFC device includes a first surface 122 and a second surface 124 opposing the first surface 122. The first surface 122 includes a plurality of buttons 126 and the second surface 124 includes an adhesive (not illustrated) formed thereon for purposes of attaching the user-interactive passive NFC device 120 to the mobile device 110. Each of the buttons 126 are recessed with respect to the first surface 122. The NFC device is programmable by the mobile device 110 such that the buttons 126 correspond to commands executable by the mobile device 110. For example, the buttons may correspond to commands associated with the PaaK feature (e.g., remote lock command). The commands may be predetermined by a manufacturer or user-configurable via the mobile device 110.

The vehicle 130 may be a standard gasoline powered vehicle, a hybrid vehicle, an electric vehicle, a fuel cell vehicle, and/or any other mobility implement type of vehicle. The vehicle 130 includes parts related to mobility, such as a powertrain with an engine, a transmission, a suspension, a driveshaft, and/or wheels, etc. The vehicle 130 may be semi-autonomous (e.g., some routine motive functions controlled by the vehicle) or autonomous (e.g., motive functions are controlled by the vehicle without direct driver input). The vehicle 130 includes vehicle doors 140, an infotainment head unit 150, a communication module 160, and an on-board computing platform 170.

The vehicle doors 140 are slidably or pivotably attached to the vehicle. The vehicle doors provide an access from an exterior to a vehicle cabin and vice-versa. Each of the vehicle doors may include a vehicle door lock and an electronic latch (e-latch) for latching and unlatching the vehicle door lock to a frame of the vehicle (not illustrated). Each of the vehicle doors may further include at least one processor, at least one memory, at least one antenna (not illustrated). The at least one processor and the at least one antenna define an NFC reader 142. It should be appreciated that the at least one processor of the NFC reader 142 may be disposed in any portion within the vehicle 130 and/or may be defined, at least in part, by any processor existing within the vehicle 130. Each of the vehicle doors may further include a back-up power supply 144 for supplying power to the vehicle doors 140 when the vehicle's main power supply (not illustrated) is depleted. It should be appreciated that the back-up power supply 144 may be located in other areas within the vehicle 130. It should be further appreciated that each of the vehicle doors 140 may further include one or more switches for controlling said vehicle door 140, one or more motors for automatically controlling movements of said vehicle door 140, and any additional hardware devices for operating said vehicle door 140.

The infotainment head unit 150 provides an interface between the vehicle 130 and a user. The infotainment head unit 150 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 150 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.).

The communication module 160 of the illustrated example includes wired or wireless network interface(s) that enable communication with the mobile device 110, the NFC device 120, an external server, other vehicles, etc. The communication module 160 includes hardware (e.g., processors, memory, storage, antenna, etc.) and software to control the wired or wireless network interface(s). In some examples, the communication module 160 includes a wireless personal area network (WPAN) module that is configured to wirelessly communicate with nearby device(s) via short-range wireless communication protocol(s). For example, the communication module 160 includes antenna(s) to wirelessly communicate via the Bluetooth® and/or Bluetooth® Low Energy (BLE) protocols. Additionally or alternatively, the communication module 160 includes antenna(s) to wirelessly communicate via Wi-Fi®, low frequency (LF) communication, Near-Field Communication (NFC), Radio-Frequency Identification (RFID), ultra-wide band (UWB) communication, ultra-high frequency (UHF) communication, and/or any other wireless communication protocol. Additionally or alternatively, the communication module 160 includes wired or wireless network interface(s) that enable communication with external networks. For example, the communication module 160 is configured to wirelessly communicate with a nearby device via an external network. The external network(s) may be a public network, such as the Internet; a private network, such as an intranet; or combinations thereof, and may utilize a variety of networking protocols now available or later developed including, but not limited to, TCP/IP-based networking protocols. For example, the communication module includes one or more communication controllers for cellular networks, such as Global System for Mobile Communications (GSM), Universal Mobile Telecommunications System (UMTS), Long Term Evolution (LTE), Code Division Multiple Access (CDMA). At least one processor and at least one antenna included in the communication module 160 define an NFC reader and writer (not illustrated).

The on-board computing platform 170 includes a processor or controller 172 and memory 174. In the illustrated example, the on-board computing platform 170 is structured to include a vehicle key manager 176. Alternatively, in some examples, the vehicle key manager 176 may be incorporated into another electronic control unit (ECU) with its own processor and memory. The processor or controller 172 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 174 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 174 includes multiple kinds of memory, particularly volatile memory and non-volatile memory.

The memory 174 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 174, the computer readable medium, and/or within the processor 172 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Herein, operations of the vehicle key manager 176 will be described in detail.

At the outset, it is assumed that the mobile device 110 is designated as a PaaK. In response, the vehicle key manager 176 enables the mobile device 110 to distribute the digital vehicle key to the NFC device 120. Specifically, the vehicle key manager 176 registers the NFC device 120 as a back-up key.

In some examples, the back-up key may be used when a power supply of the mobile device 110 is depleted. The vehicle key manager 176 may identify that the mobile device 110 is out of power when the communication module 160 fails to establish a communication with the mobile device 110.

In some examples, the back-up key may be used when the power supply of the vehicle is out of power. When the vehicle is out of power, the vehicle key manager 176 uses the back-up power supply 144 to enable the NFC readers 142 included in the vehicle doors 140 and verify the back-up key.

When the mobile device 110 writes the digital vehicle key to the NFC device 120, the vehicle key manager 176 establishes an identity of the NFC device 120. Specifically, the vehicle key manager 176 may generate a table including an identification for each NFC device 120 including the digital vehicle key written therein. The identification may be a unique serial number, an encryption key, etc., for identifying and distinguishing the NFC device 120 from other NFC devices. In some examples, the identification is predetermined by the manufacturer of the NFC device 120. In such examples, the vehicle key manager 176 may read the identification from the NFC device 120 and refer to the NFC device 120 based on the identification. In some examples, an NFC device 120 may include the identification physically labeled on the NFC device 120. In such examples, the user may input the identification via the mobile device 110 or the infotainment head unit 150 and in response, the vehicle key manager 176 may record the identification in the table. In some examples, the vehicle key manager 176 may generate and assign a unique identification to the NFC device 120 if the NFC device did not previously include any identification stored therein or if an identification stored in the NFC device 120 matches at least one of identifications included within the table.

In some examples, the vehicle key manager 176 may further enable the mobile device 110 to designate another mobile device 110 as a PaaK. In such examples, the mobile device 110 may transfer the digital vehicle key to a second mobile device, and the second mobile device may also have the privilege to further distribute the digital vehicle key to other NFC devices or mobile devices. Similar to establishing a unique identification for the NFC device 120, the vehicle key manager 176 may generate a unique identification for each additional mobile devices functioning as a PaaK and store the unique identification in the table.

Using the table, the vehicle key manager 176 is operable to: (1) identify each device including the digital vehicle key; (2) account for total number of distributions of the digital vehicle key for all or each mobile devices; (3) generate a history of distributions of the digital vehicle key; (4) account for total number of uses of the digital vehicle key (e.g., uses for one or more features of PEPS systems) via all or each devices including the digital vehicle keys.

Further, using the table, the vehicle key manager 176 may grant one or more privileges to certain devices including the digital vehicle key. The privileges may include: (1) a number of times a device including the digital vehicle key can distribute the digital vehicle key; (2) one or more conditions in which a device including the digital vehicle key can distribute the digital vehicle key (hereinafter referred as distribution condition); (3) a number of times a device including the digital vehicle key can be used for one or more features of PEPS systems; (4) one or more conditions in which a device including the digital vehicle key can be used for one or more features of PEPS systems (hereinafter referred as use condition). The one or more privileges may be granted based on the user's preferences or may be predetermined by the vehicle key manager 176. The one or more privileges may be configured via the infotainment head unit 150, the mobile device 110, and/or any other mobile device including the digital vehicle key. The one or more distribution conditions may require: (1) a permission for distribution from one or more device that has provided or previously included the digital vehicle key; (2) a distribution to take place in a certain time frame (e.g., within 5 minutes of receiving a request for distribution from another device); and/or (3) require a distribution to take place in a certain location (e.g., within a vehicle cabin). The one or more use conditions may require: (1) one or more devices that has provided or previously included the digital vehicle key to be inoperable (e.g., a mobile device 110); (2) the vehicle 130 to be out of power; and/or (3) the use of the digital vehicle key to take place in a certain time frame (e.g., within 5 minutes of receiving the digital vehicle key).

It should be appreciated that one or more operations of the vehicle key manager 176 may be performed by the mobile device 110. For example, the mobile device 110 may generate and/or update the table for each time when the mobile device 110 transfers the digital vehicle key to another mobile device and/or NFC device. In another example, the mobile device 110 may generate and assign a unique identification to each NFC device 120 including the digital vehicle key. In such examples, the mobile device 110 transfers the unique identification to the NFC device 120 and the vehicle 130. In such examples, the mobile device 110 performs a verification step prior to transferring the unique identification to the NFC device 120 and/or the vehicle 130. The verification step may requires the user to verify his/her identify to the mobile device 110 by: (1) providing a biometric input (e.g., finger print analysis via the biometric sensor and/or facial image analysis); (2) responding to a verification email or text message transmitted via a trusted external server; and/or (3) positioning a key fob of the user within a predetermined proximity of the mobile device. It should be appreciated that the vehicle key manager 176 and other mobile devices including the digital vehicle key may share the same table and update the table each time the communication module 160 or the mobile devices 110 transfers the digital vehicle key to another mobile device and/or NFC device. It should be appreciated that if the mobile device 110 or the vehicle key manager 176 does not have the latest version of the table, the table may be updated based on the table of another mobile device 110 including the digital vehicle key. It should be appreciated that the trusted external server may also include the latest version of the table.

FIG. 2 illustrates an example table 200 generated by the vehicle key manager 176 by the vehicle 130 of FIG. 1. In the illustrated example, the vehicle key manager 176 has registered three mobile devices and two NFC devices as including the digital vehicle key. In the illustrated example, the NFC devices are passive.

The first row 210 indicates the type, the identification, the device's ability to distribute the digital vehicle key, a provider of the digital vehicle key, one or more recipients of the digital vehicle key, the number of distributions allowed, one or more distribution condition, the number of allowed uses of the digital vehicle key, and one or more use conditions.

The second row 220 indicates a mobile device having an identification label (A). While the illustrated example exemplifies the identification labeled as a single letter, it should be appreciated that the identification label may include a plurality of alphanumeric characters. In this illustrated example, the mobile device (A): (1) is registered as being capable of distributing the digital vehicle key; (2) has received the digital vehicle key from an external server; (3) has transmitted the digital vehicle key to an NFC device (B) and a mobile device (C); (4) is allowed to distribute the digital vehicle key up to five times without restriction; and (5) has no restriction for using the digital vehicle key.

The third row 230 indicates an NFC device (B). The NFC device (B): (1) is registered as being incapable of distributing the digital vehicle key; (2) has received the digital vehicle key from the mobile device (A); and (3) is allowed to be used up to five times when the mobile device (A) is out of power or when the vehicle is out of power.

The fourth row 240 indicates a mobile device (C). The mobile device (C): (1) is registered as being capable of distributing the digital vehicle key; (2) has received the digital vehicle key from the mobile device (A); (3) has transmitted the digital vehicle key to an NFC device (D); (4) requires permission from the mobile device (A) to distribute the digital vehicle key; (5) is allowed to distribute the digital vehicle key up to three times; and (6) has no restriction for using the digital vehicle key.

The fifth row 250 indicates an NFC device (D). The NFC device (D): (1) is registered as being incapable of distributing the digital vehicle key; (2) has received the digital vehicle key form the mobile device (A); and (3) is allowed to be used up to four times when the mobile device (A) and the mobile device (C) are out of power or when the vehicle is out of power.

The sixth row 260 indicates the mobile device (E). The mobile device (E): (1) is registered as being capable of distributing the digital vehicle key; (2) has received the digital vehicle key from the mobile device (C); (3) has not transmitted the digital vehicle key to any device; (4) requires permission from the mobile devices (A) and (C) to distribute the digital vehicle key; (5) is allowed to distribute the digital vehicle key up to three times; (6) is allowed to use the digital vehicle key up to three times; and (7) has a 2 hour window for using the digital vehicle key.

Figure 3A:
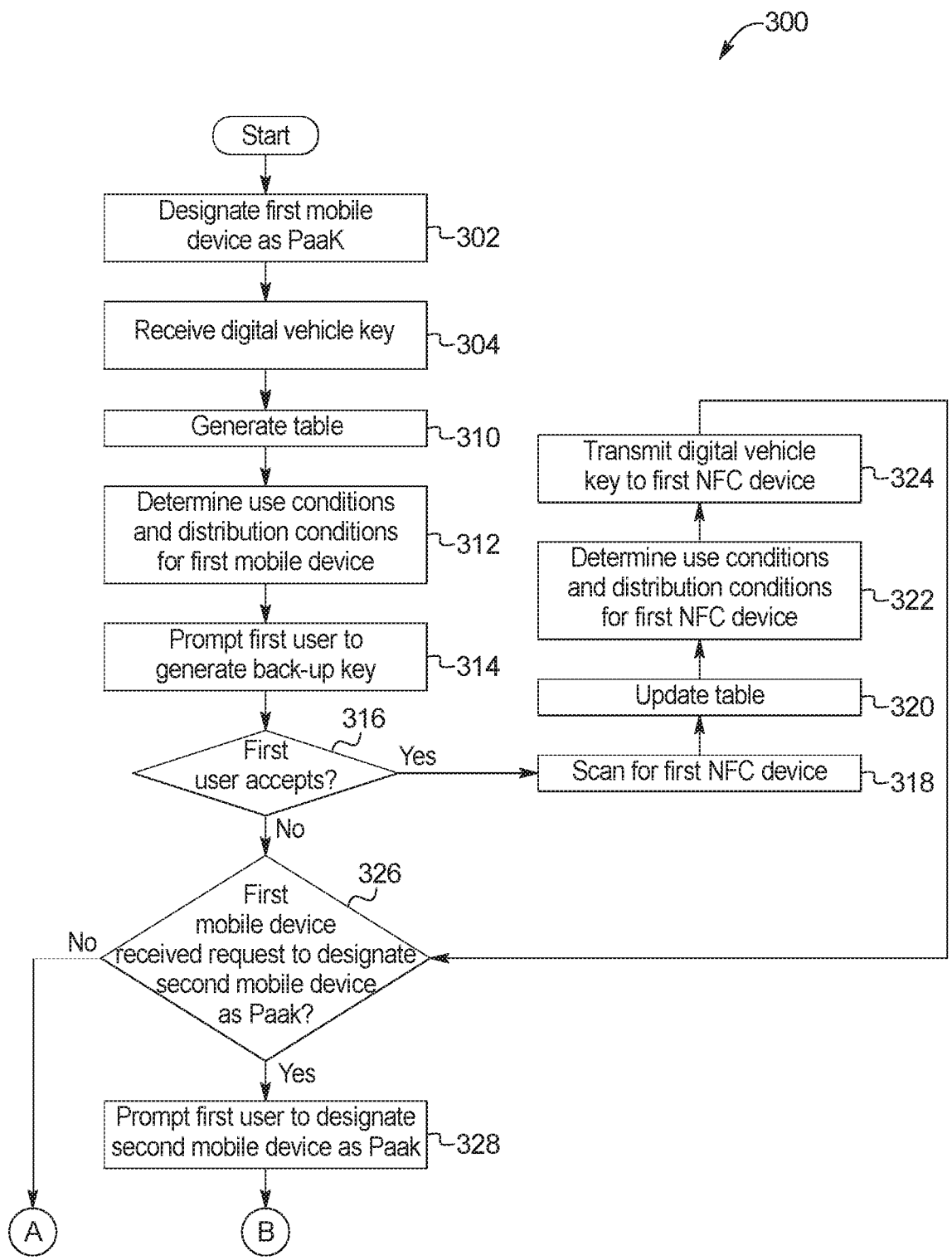
FIGS. 3A and 3B illustrates a flowchart of a method for distributing a digital vehicle key.
Figure 3B:
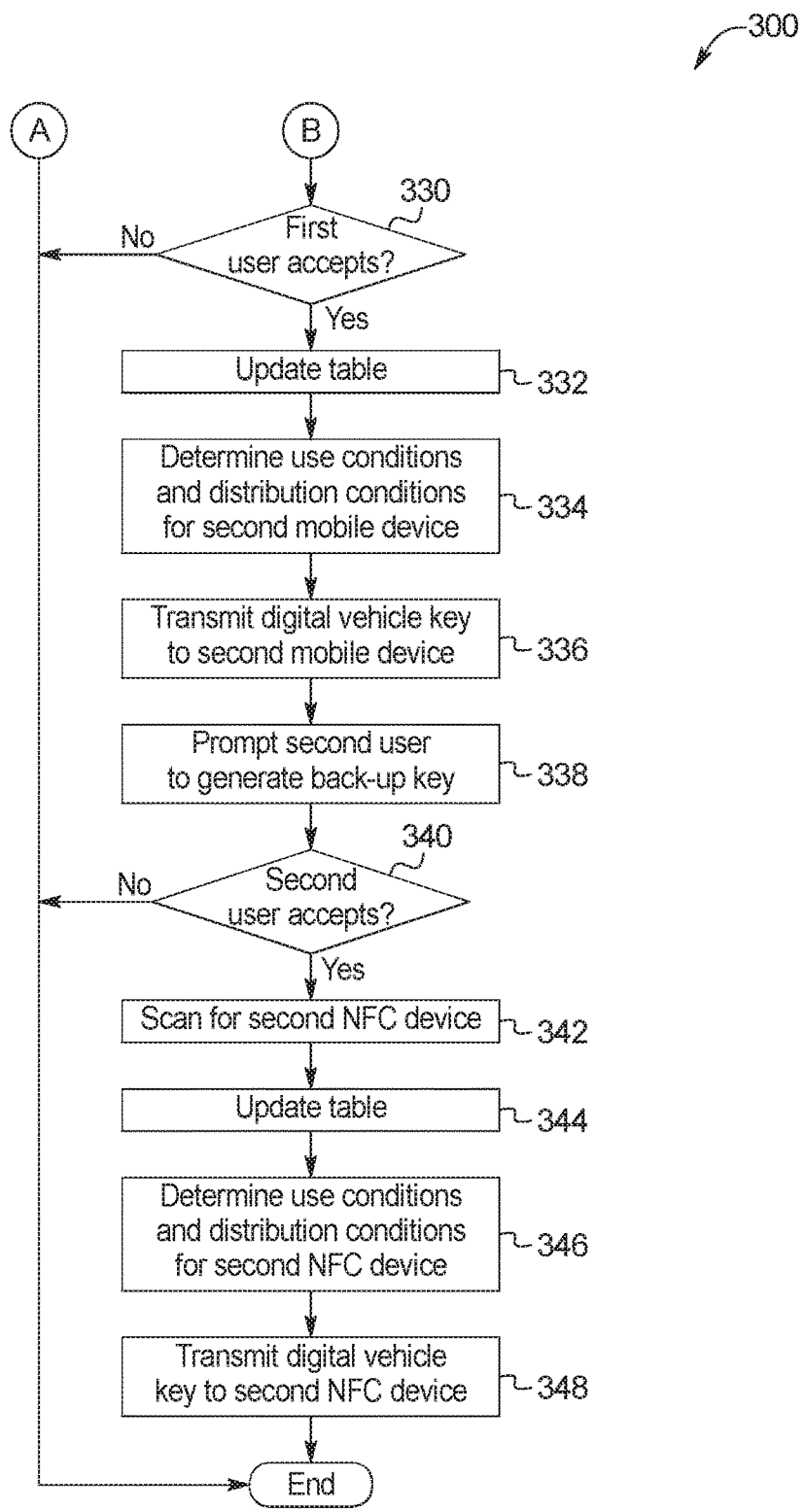

FIGS. 3A and 3B illustrates a flowchart of a method 300 for distributing a digital vehicle key.

At block 302, a user designates a first mobile device as a PaaK.

At block 304, a trusted external server delivers the digital vehicle key to the first mobile device and the vehicle 130. In some examples, the vehicle 130 may already include the digital vehicle key.

At block 310, the vehicle key manager 176 generates a table and enters information regarding the first mobile device to the table.

At block 312, the vehicle key manager 176 determines use conditions and distribution conditions for the first mobile device.

At block 314, the infotainment head unit 150 prompts the first user whether the first user wishes to generate a back-up key. Alternatively, at block 314, the first mobile device prompts the first user.

At block 316, if the first user accepts, the method 300 continues to block 318. Otherwise, the method 300 continues to block 326.

At block 318, the first mobile device scans for a first NFC device.

At block 320, the vehicle key manager 176 updates the table to include information regarding the NFC device.

At block 322, the vehicle key manager 176 determines use conditions and distribution conditions for the first NFC device.

At block 324, the mobile device transmits the digital vehicle key to the first NFC device.

At block 326, the vehicle key manager 176 determines whether the first mobile device has received a request from a second user to designate a second mobile device as a PaaK. If so, the method 300 continues to block 328. Otherwise, the method 300 terminates.

At block 328, the first mobile device or the infotainment head unit 150 prompts the first user whether said user allows the second mobile device to be designated as a PaaK.

At block 330, if the first user accepts, the method 300 continues to block 332. Otherwise, the method 300 terminates.

At block 332, the vehicle key manager 176 updates the table to include information regarding the second mobile device.

At block 334, the vehicle key manager 176 determines use conditions and distribution conditions for the second mobile device.

At block 336, the first mobile device or the trusted external server transmits the digital vehicle key to the second mobile device and the vehicle 130. In some examples, the vehicle 130 may already include the digital vehicle key.

At block 338, the second mobile device prompts the second user whether the second user wishes to generate a back-up key.

At block 340, if the second user accepts, the method 300 continues to block 342. Otherwise, the method 300 terminates.

At block 342, the second mobile device scans for a second NFC device.

At block 344, the vehicle key manager 176 updates the table to include information regarding the second NFC device.

At block 346, the vehicle key manager 176 determines use conditions and distribution conditions for the second NFC device.

At block 348, the second mobile device transmits the digital vehicle key to the second NFC device.

Although the example program(s) is/are described with reference to the flowchart illustrated in FIGS. 3A and 3B, many other methods of distributing the digital vehicle key may alternatively be used. For example, in the method 300, the digital vehicle key may be further distributed to additional mobile devices and NFC devices. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
a vehicle;
a first passive Near-Field Communication (NFC) device, wherein the first passive NFC device is unpowered and uses electromagnetic field generated by another electronic device to power itself; and
a first mobile device communicatively coupled to the vehicle and including a digital vehicle key;
a computer processor operable to execute a set of computer-readable instructions; and
a memory operable to store the set of computer-readable instructions operable to:
distribute the digital vehicle key to the first passive NFC device; and
inform the vehicle an instance in which the first mobile device has distributed the digital vehicle key to the first passive NFC device.

2. The system of claim 1, further comprising:
a second passive NFC device; and
a second mobile device configured to:
request the digital vehicle key from the first mobile device; and
responsive to receiving the digital vehicle key from the first mobile device, distribute the digital vehicle key to the second passive NFC device.

3. The system of claim 2, wherein the vehicle is communicatively coupled to the second mobile device, wherein the second mobile device is further configured to inform the vehicle an instance in which the second mobile device has distributed the digital vehicle key to the second passive NFC device.

4. The system of claim 2, wherein the second mobile device is further configured to inform the first mobile device an instance in which the second mobile device has distributed the digital vehicle key to the second passive NFC device, and wherein the first mobile device is further configured to inform the vehicle the instance in which the second mobile device has distributed the digital vehicle key to the second passive NFC device.

5. The system of claim 1, wherein the computer-readable instructions are further operable to, responsive to distributing the digital vehicle key to the first passive NFC device:
generate a table including an identification associated with the first passive NFC device; and
transmit the table to the vehicle.

6. The system of claim 5, wherein the identification is predetermined by a manufacturer of the first passive NFC device.

7. The system of claim 5, wherein the computer-readable instructions are further operable to associate a use condition to the identification.

8. The system of claim 7, wherein the computer-readable instructions are further operable to:
determine that a power supply of the vehicle is out of power; and
use, based on the determination that the power supply of the vehicle is out of power, the passive NFC device as a key for accessing the vehicle.

9. The system of claim 7, wherein the computer-readable instructions are further operable to:
determine that a power supply of the first mobile device is out of power; and
use, based on the determination that the power supply of the first mobile device is out of power, the passive NFC device as a key for accessing the vehicle.

10. The system of claim 1, wherein the first mobile device is configured to distribute the digital vehicle key based on a distribution condition.

11. The system of claim 10, wherein the distribution condition limits a number of times the first mobile device is allowed to distribute the digital vehicle key.

12. A method comprising:
distributing a digital vehicle key stored in a first mobile device to a first passive Near-Field Communication (NFC) device, wherein the first passive NFC device is unpowered and uses electromagnetic field generated by another electronic device to power itself; and
informing a vehicle communicatively coupled to the first mobile device an instance in which the first mobile device has distributed the digital vehicle key to the first passive NFC device.

13. The method of claim 12, further comprising:
receiving, at the first mobile device, a request for the digital vehicle key from a second mobile device; and
responsive to receiving the digital vehicle key from the first mobile device, allowing the second mobile device to distribute the digital vehicle key to a second passive NFC device.

14. The method of claim 13, further comprising informing the vehicle an instance in which the second mobile device has distributed the digital vehicle key to the second passive NFC device.

15. The method of claim 12, further comprising, responsive to distributing the digital vehicle key to the first passive NFC device:
generating, at the first mobile device, a table including an identification associated with the first passive NFC device; and
transmitting the table to the vehicle.

16. The method of claim 15, wherein the identification is predetermined by a manufacturer of the first passive NFC device.

17. The method of claim 15, further comprising associating a use condition to the identification.

18. The method of claim 17, further comprising:
determining that a power supply of the vehicle is out of power; and
using, based on the determination that the power supply of the vehicle is out of power, the passive NFC device as a key for accessing the vehicle.

19. The method of claim 17, further comprising:
determine that a power supply of the first mobile device is out of power; and
use, based on the determination that the power supply of the first mobile device is out of power, the passive NFC device as a key for accessing the vehicle.

20. A non-transitory computer readable media storing instructions that are executable via processors to perform operations comprising:
distributing a digital vehicle key stored in a first mobile device to a first passive Near-Field Communication (NFC) device, wherein the first passive NFC device is unpowered and uses electromagnetic field generated by another electronic device to power itself;
informing a vehicle communicatively coupled to the first mobile device an instance in which the first mobile device has distributed the digital vehicle key to the first passive NFC device;
determining that a power supply of the first mobile device is out of power; and
using, based on the determination that the power supply of the first mobile device is out of power, the passive NFC device as a key for accessing the vehicle.

* * * * *